US010664416B2

(12) United States Patent
Lal et al.

(10) Patent No.: US 10,664,416 B2
(45) Date of Patent: May 26, 2020

(54) TECHNOLOGIES FOR TRUSTED I/O SUPPORT FOR I/O DEVICES USING EXTERNAL PERIPHERAL DEVICE LINK CONTROLLER

(71) Applicant: Intel Corporation, Santa Clara, CA (US)

(72) Inventors: Reshma Lal, Hillsboro, OR (US); Siddhartha Chhabra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 15/857,803

(22) Filed: Dec. 29, 2017

(65) Prior Publication Data
US 2019/0042485 A1 Feb. 7, 2019

(51) Int. Cl.
H04L 29/06 (2006.01)
G06F 13/12 (2006.01)
G06F 21/85 (2013.01)
G06F 1/16 (2006.01)
G06F 21/57 (2013.01)
G06F 21/60 (2013.01)

(52) U.S. Cl.
CPC .......... G06F 13/122 (2013.01); G06F 1/1632 (2013.01); G06F 21/57 (2013.01); G06F 21/602 (2013.01); G06F 21/85 (2013.01)

(58) Field of Classification Search
CPC combination set(s) only.
See application file for complete search history.

(56) References Cited

U.S. PATENT DOCUMENTS

| 7,681,036 B1* | 3/2010 | Zuber | H04B 1/0003 713/166 |
| 2009/0022085 A1* | 1/2009 | Dankberg | H04B 7/18582 370/316 |
| 2009/0119393 A1* | 5/2009 | Ros-Giralt | H04L 69/161 709/223 |
| 2013/0291060 A1* | 10/2013 | Moore | G06F 21/6245 726/1 |
| 2015/0356045 A1* | 12/2015 | Soffer | G06F 13/4221 710/303 |
| 2017/0024570 A1* | 1/2017 | Pappachan | G06F 13/28 |

(Continued)

Primary Examiner — Malcolm Cribbs
(74) Attorney, Agent, or Firm — Barnes & Thornburg LLP

(57) ABSTRACT

Technologies for secure I/O with an external peripheral device link controller include a computing device coupled to an external dock device by an external peripheral link, such as a Thunderbolt link. The external dock device includes an I/O controller that receives device data from an I/O device, generates a channel identifier associated with the I/O device, and transmits I/O data that includes the channel identifier to a dock controller. The dock controller encapsulates the I/O data to generate peripheral link protocol data and transmits the peripheral link protocol data to a host controller of the computing device over the external peripheral link. The host controller de-encapsulates the peripheral link protocol data and forwards the I/O data to memory. The channel identifier may be a predetermined value associated with the I/O controller, or may include a controller identifier associated with the host controller. Other embodiments are described and claimed.

25 Claims, 4 Drawing Sheets

(56) References Cited

U.S. PATENT DOCUMENTS

2017/0032132 A1* 2/2017 McGowan ............ G06F 21/602
2017/0185804 A1* 6/2017 Elbaz .................... G06F 13/287
2018/0285305 A1* 10/2018 Pappu .................... G06F 13/42

\* cited by examiner

TECHNOLOGIES FOR TRUSTED I/O SUPPORT FOR I/O DEVICES USING EXTERNAL PERIPHERAL DEVICE LINK CONTROLLER

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data for a given computing device while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Trusted I/O (TIO) technology enables an application to send and/or receive I/O data securely to/from a device. In addition to the hardware that produces or consumes the I/O data, several software and firmware components in the I/O pipeline might also process the data. HCTIO (Hardware Cryptography-based Trusted I/O) is a technology that provides cryptographic protection of DMA data via an inline Crypto Engine (CE) in the system-on-a-chip (SoC). Channel ID, an identifier, uniquely identifies a DMA channel on the platform, and the CE filters DMA traffic and encrypts select I/O transactions upon a match with the Channel ID programmed in the CE. Certain devices may provide trusted I/O using an inline Channel ID filter in the SoC and a processor-based Crypto Engine (e.g., using microcode or other processor resources).

Thunderbolt™ technology includes a family of high-performance external peripheral interfaces. A Thunderbolt connection may support multiple modes of data transferred over one or more high-speed bidirectional data links. For example, a single Thunderbolt cable may support transferring PCI Express® (PCIe) data, DisplayPort™ graphics data, or USB-C data. Certain Thunderbolt interfaces may also support power delivery.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
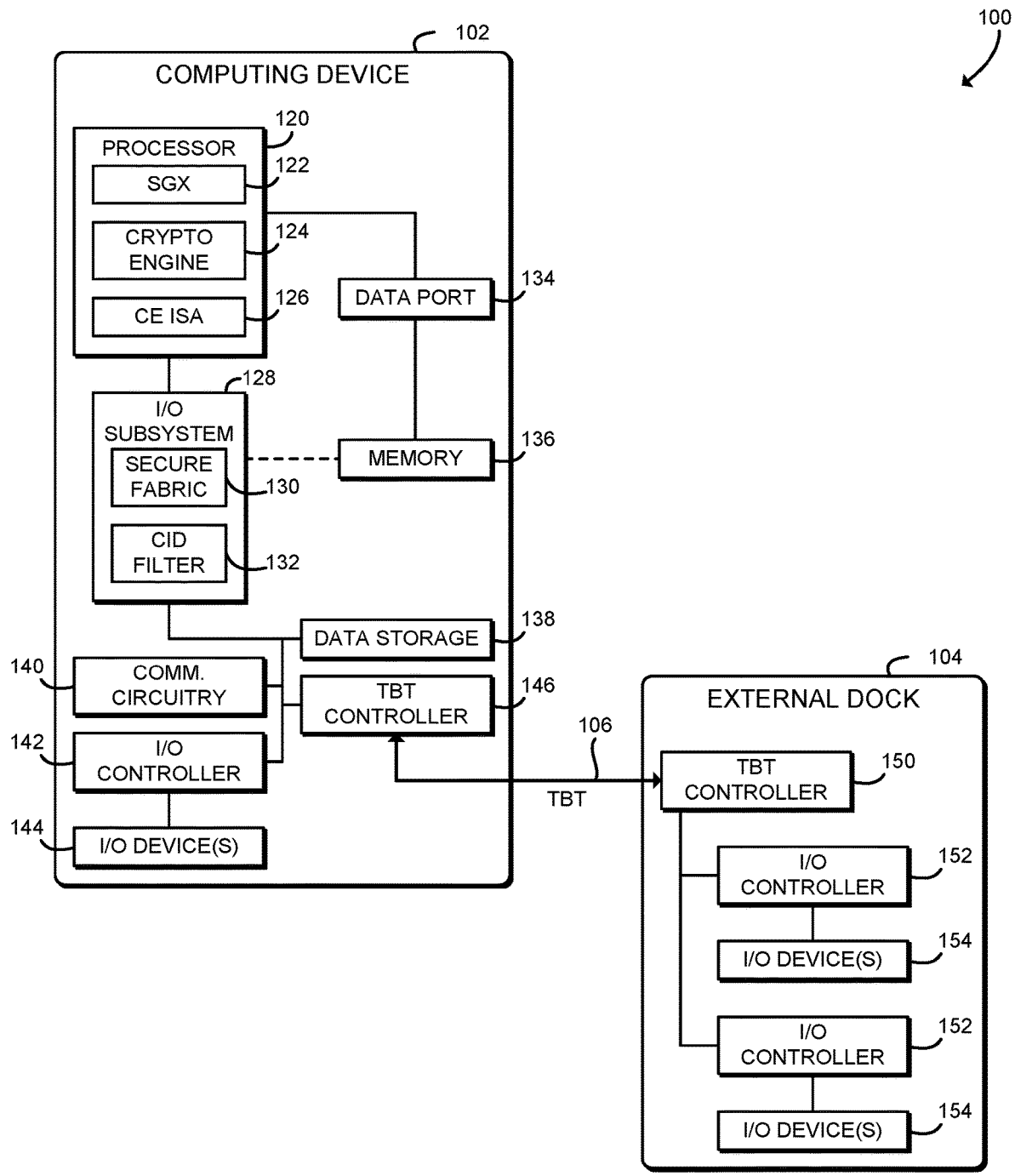
FIG. 1 is a simplified block diagram of at least one embodiment of a system for trusted I/O using an external peripheral link controller.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for trusted I/O using an external peripheral link controller includes a computing device 102 coupled to an external dock 104 over a Thunderbolt (TBT) link 106. As shown, a TBT controller 146 of the computing device 102 is connected by the TBT link 106 to a TBT controller 150 of the external dock 104. In use, as described further below, an I/O controller of the external dock 104 generates I/O data that includes a channel ID (CID) that identifies the source of the I/O data (e.g., an I/O device or other DMA channel). The TBT controller 150 encapsulates the I/O data and transmits the encapsulated data over the TBT link 106 to the TBT controller 146. The TBT controller 146 de-encapsulates the I/O data and forwards the I/O data to memory. A CID filter, cryptographic engine, or other trusted I/O components of the computing device 102 may verify the CID and otherwise protect the I/O data. Thus, the system 100 may provide trusted I/O data and integrity protection for I/O devices that are connected to an external dock 104 or otherwise communicate with the computing device 102 over an external peripheral link such as Thunderbolt. Additionally, as described further below, in some embodiments CID assignment may be scalable to support multiple different types of external docks 104 that each include a different type and/or number of I/O controllers.

The computing device 102 may be embodied as any type of device capable of performing the functions described herein. For example, the computing device 102 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 102 includes a processor 120, an I/O subsystem 128, a memory 136, a data storage device 138, and one or more I/O controllers 142. Additionally, in some embodiments, one or more of the illustrative components may be incorporated in, or otherwise form a portion of, another component. For example, the memory 136, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, a cryptographic engine 124, and a cryptographic engine instruction set architecture (ISA) 126. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 136. The secure enclave support 122 may be embodied as a set of processor instruction extensions that allows the processor 120 to establish one or more secure enclaves in the memory 136. For example, the secure enclave support 122 may be embodied as Intel® Software Guard Extensions (SGX) technology.

The cryptographic engine 124 may be embodied as one or more hardware functional blocks (IP blocks), microcode, or other resources of the processor 120 that allows the processor 120 to perform trusted I/O (TIO) functions. For example, as described further below, the cryptographic engine 124 may perform TIO functions such as encrypting and/or decrypting DMA I/O data input from and/or output to one or more I/O devices 144, 154. In particular, in some embodiments, plaintext I/O data may be stored in a TIO Processor Reserved Memory (TIO PRM) region that is not accessible to software of the computing device 102, and the cryptographic engine 124 may be used to encrypt the plaintext DMA I/O data and copy the encrypted data to an ordinary kernel I/O buffer. The processor 120 may also include one or more range registers or other features to protect the TIO PRM from unauthorized access.

The cryptographic engine ISA 126 may be embodied as one or more processor instructions, model-specific registers, or other processor features that allows software executed by the processor 120 to securely program and otherwise use the cryptographic engine 124 and a corresponding CID filter 132, described further below. For example, the cryptographic engine ISA 126 may include processor features to bind programming instructions to the cryptographic engine 124 and/or the CID filter 132, unwrap bound programming instructions, securely clean the TIO PRM region of the memory 136, and/or securely copy and encrypt data from the TIO PRM region to a kernel I/O buffer.

The memory 136 may be embodied as any type of volatile or non-volatile memory or data storage capable of performing the functions described herein. In operation, the memory 136 may store various data and software used during operation of the computing device 102 such as operating systems, applications, programs, libraries, and drivers. Further, the memory 136 may also include the TIO PRM region. The memory 136 is illustratively connected with a data port 134 to send and receive data from the processor 120 and the I/O subsystem 128. Additionally or alternatively, in some embodiments, the memory 136 may be communicatively coupled to the processor 120 via the I/O subsystem 128. The I/O subsystem 128 may be embodied as circuitry and/or components to facilitate input/output operations with the processor 120, the memory 136, and other components of the computing device 102. For example, the I/O subsystem 128 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 136 may be directly coupled to the processor 120, for example via an integrated memory controller hub. The I/O subsystem 128 may further include a secure fabric 130. The secure fabric 130 provides secure routing support, which may include hardware support to ensure I/O data cannot be misrouted in the I/O subsystem 128 under the influence of rogue software. As described further below, the secure fabric 130 may be used with the CID filter 132 to provide cryptographic protection of I/O data. Additionally, in some embodiments, the I/O subsystem 128 may form a portion of a system-on-a-chip (SoC) and be incorporated, along with the processor 120, the memory 136, and other components of the computing device 102, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 136.

The data storage device 138 may be embodied as any type of device or devices configured for short-term or long-term storage of data such as, for example, memory devices and circuits, memory cards, hard disk drives, solid-state drives, non-volatile flash memory, or other data storage devices. The computing device 102 may also include a communications subsystem 140, which may be embodied as any communication circuit, device, or collection thereof, capable of enabling communications between the computing device 102 and other remote devices over a computer network (not shown). The communications subsystem 140 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The CID filter 132 may be embodied as any hardware component, functional block, logic, or other circuit that performs CID filtering function(s), including filtering I/O transactions based on CIDs inserted by the I/O controllers 142, 152. For example, the CID filter 132 may observe DMA transactions inline, perform test(s) based on the CID and memory address included in the transaction, and drop transactions that fail the test(s). In the illustrative embodiment, the CID filter 132 is incorporated in the I/O subsystem 128. In other embodiments, the CID filter 132 may be included in one or more other components and/or in an SoC with the processor 120 and I/O subsystem 128 as a separate component.

Each of the I/O controllers 142 may be embodied as any universal serial bus (USB) controller, embedded controller, microcontroller, microprocessor, functional block, logic, or other circuit or collection of circuits capable of performing the functions described herein. In some embodiments, one or more of the I/O controllers 142 may be embedded in another component of the computing device 102 such as the I/O subsystem 128 and/or the processor 120. Additionally or alternatively, one or more of the I/O controllers 142 may be connected to the I/O subsystem 128 and/or the processor 120 via an expansion bus such as PCI Express (PCIe) or other I/O connection. As described above, the I/O controllers 142 communicate with one or more I/O devices 144, for example over a peripheral communications bus (e.g., USB, Bluetooth, etc.). The I/O devices 144 may be embodied as any I/O device, such as human interface devices, keyboards, mice, touch screens, microphones, cameras, and other input devices, as well as displays and other output devices. As described above, the I/O controllers 142 and associated DMA channels are uniquely identified using identifiers called channel identifiers (CIDs). Each I/O controller 142 may assert an appropriate CID with every DMA transaction, for example as part of a transaction layer packet (TLP) prefix, to uniquely identify the source of the DMA transaction and provide liveness protections. The CID also enables the isolation of I/O from different devices 144, 154.

As described above, the computing device 102 further includes a Thunderbolt (TBT) controller 146, which may be embodied as any microcontroller, microprocessor, functional block, logic, or other circuit or collection of circuits capable of performing the functions described herein. As shown, the TBT controller 146 may be connected to the I/O subsystem 128 and/or the processor 120 via an expansion bus such as PCI Express (PCIe) or other I/O connection, such as the internal secure fabric 130. The TBT controller 146 also includes a physical layer capable of communicating data over the TBT link 106 with the external dock 104.

The external dock 104 may be embodied as a docking station, port expander, breakout box, adapter, or other device capable of performing the functions described herein. As shown, the external dock 104 includes a TBT controller 150 and one or more I/O controllers 152 coupled to the TBT controller 150. Similar to the TBT controller 146, the TBT controller 150 may be embodied as any microcontroller, microprocessor, functional block, logic, or other circuit or collection of circuits capable of performing the functions described herein. As shown, the TBT controller 150 includes a physical layer capable of communicating data over the TBT link 106 with the computing device 102.

Each of the I/O controllers 152 may be embodied as any universal serial bus (USB) controller, embedded controller, microcontroller, microprocessor, functional block, logic, or other circuit or collection of circuits capable of performing the functions described herein. Each of the I/O controllers 152 may be connected to the TBT controller 150 via an expansion bus such as PCI Express (PCIe) or other I/O connection. The I/O controllers 152 communicate with one or more I/O devices 154, for example over a peripheral communications bus (e.g., USB, Bluetooth, etc.). The I/O devices 154 may be embodied as any I/O device, such as human interface devices, keyboards, mice, touch screens, microphones, cameras, and other input devices, as well as displays and other output devices. As described above, the I/O controllers 152 and associated DMA channels are uniquely identified using identifiers called channel identifiers (CIDs). Each I/O controller 152 may assert an appropriate CID with every DMA transaction, for example as part of a transaction layer packet (TLP) prefix, to uniquely identify the source of the DMA transaction and provide liveness protections. The CID also enables the isolation of I/O from different devices 144, 154.

The TBT link 106 may be embodied as a cable, docking port, or other external connector that couples the computing device 102 and the external dock 104. The TBT link 106 may include one or more bidirectional data lanes, which may be embodied as copper cabling or other electrical links, optical links, or other communication links. Additionally or alternatively, although illustrated as including TBT controllers 146, 150 and TBT link 106, it should be understood that in other embodiments the system 100 may include any external peripheral device link and associated controllers.

Figure 2:
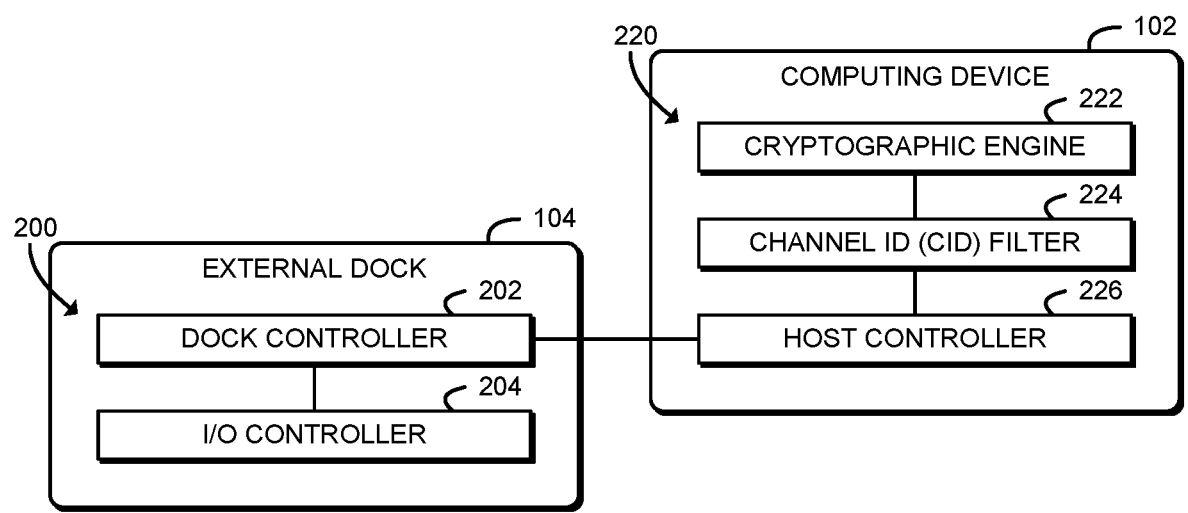
FIG. 2 is a simplified block diagram of at least one embodiment of an environment of the computing device of FIG. 1.

Referring now to FIG. 2, in an illustrative embodiment, the external dock 104 establishes an environment 200 during operation. The illustrative environment 200 includes a dock controller 202 and an I/O controller 204. The various components of the environment 200 may be embodied as hardware, firmware, software, or a combination thereof. As such, in some embodiments, one or more of the components of the environment 200 may be embodied as circuitry or collection of electrical devices (e.g., dock controller circuitry 202 and/or I/O controller circuitry 204). It should be appreciated that, in such embodiments, one or more of the dock controller circuitry 202 and/or the I/O controller circuitry 204 may form a portion of the TBT controller 150, the I/O controller 152, and/or other components of the external dock 104. Additionally, in some embodiments, one or more of the illustrative components may form a portion of another component and/or one or more of the illustrative components may be independent of one another.

The I/O controller 204 is configured to receive device data from an I/O device 154 coupled to the external dock 104. The I/O controller 204 is further configured to generate a channel identifier (CID) associated with the I/O device 154 in response to receiving the device data, and to transmit I/O data that includes the CID and the device data to the dock controller 202.

The dock controller 202 is configured to encapsulate the I/O data to generate peripheral link protocol data. The peripheral link protocol data includes the channel identifier. The dock controller 202 is further configured to transmit the peripheral link protocol data to a host controller of the computing device 102 over an external peripheral link, such as the TBT link 106. Encapsulating the I/O data may include adding a Thunderbolt header to a PCI Express packet.

Still referring to FIG. 2, in an illustrative embodiment, the computing device 102 establishes an environment 220 during operation. The illustrative environment 220 includes a cryptographic engine 222, a channel identifier (CID) filter 224, and a host controller 226. The various components of the environment 220 may be embodied as hardware, firmware, software, or a combination thereof. As such, in some embodiments, one or more of the components of the environment 220 may be embodied as circuitry or collection of electrical devices (e.g., cryptographic engine circuitry 222, CID filter circuitry 224, and/or host controller circuitry 226). It should be appreciated that, in such embodiments, one or more of the cryptographic engine circuitry 222, the CID filter circuitry 224, and/or the host controller circuitry 226 may form a portion of the processor 120, the I/O subsystem 128, the TBT controller 146, and/or other components of the computing device 102. Additionally, in some embodiments, one or more of the illustrative components may form a portion of another component and/or one or more of the illustrative components may be independent of one another.

The host controller 226 is configured to de-encapsulate the peripheral link protocol data to recover the I/O data. The recovered I/O data includes the CID that is associated with the I/O device 154 of the external dock 104. The host controller 226 may be further configured to forward the I/O data to the memory 136 of the computing device 102 in response to de-encapsulating the peripheral link protocol data.

The CID filter 224 is configured to verify the CID in response to forwarding the I/O data to the memory 136. The cryptographic engine 222 is configured to encrypt the I/O data to generate encrypted I/O data in response verifying the CID. The I/O data may be located in a protected memory region of the computing device 102. The cryptographic engine 222 is further configured to copy the encrypted data to an unprotected memory buffer.

The CID may include a predetermined integer value associated with the I/O controller 152 of the external dock 104. In some embodiments, the CID is included in a predetermined range of integer values that is associated with the I/O controller 152. Additionally or alternatively, in some embodiments, the CID may include a controller identifier that includes a predetermined integer value associated with the host controller 226. The controller identifier may include the four most-significant bits of the CID.

Figure 3:
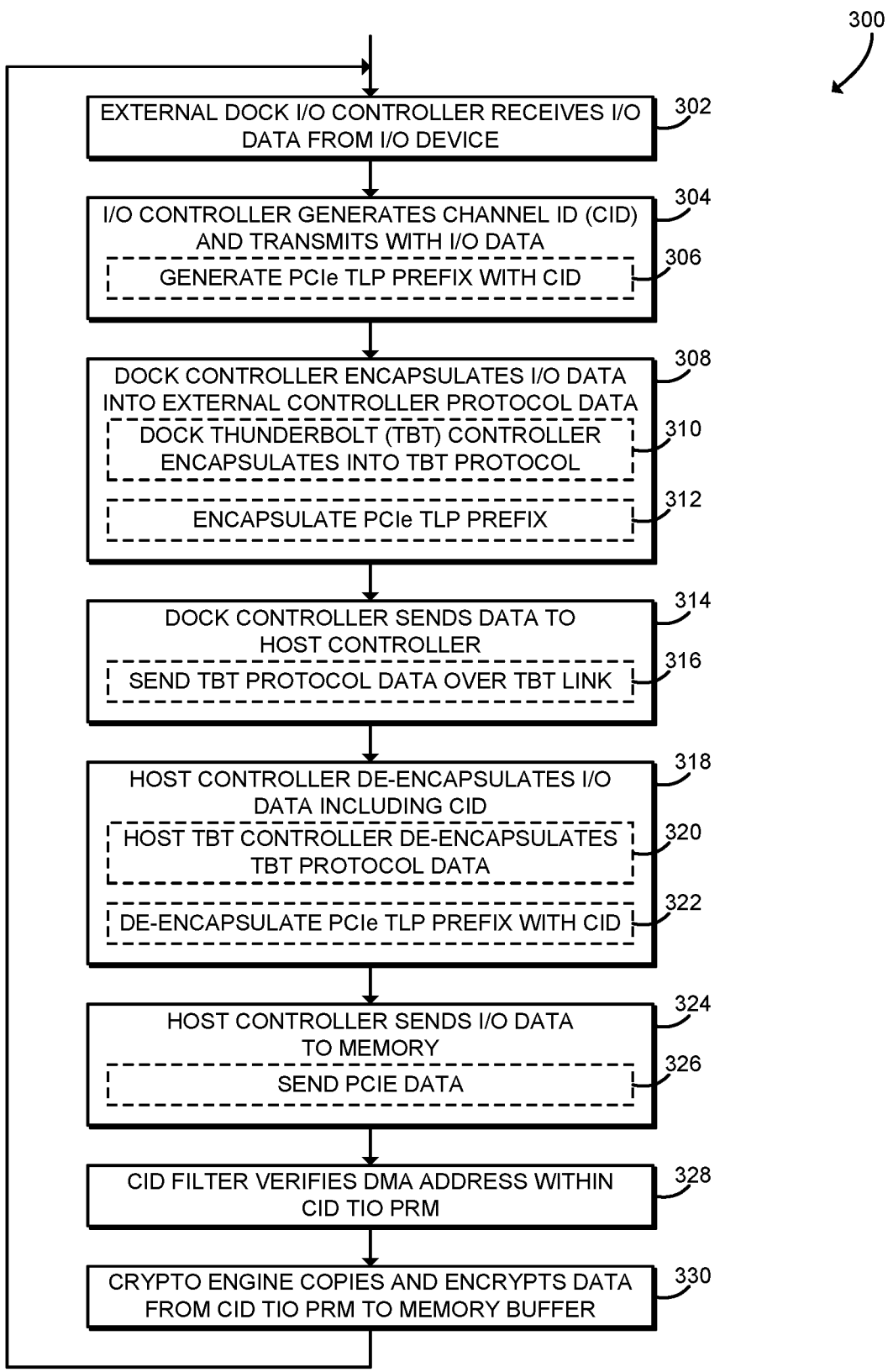
FIG. 3 is a simplified flow diagram of at least one embodiment of a method for trusted I/O using an external peripheral link controller that may be performed by the computing device of FIGS. 1-2.

Referring now to FIG. 3, in use, the system 100 may execute a method 300 for trusted I/O using an external peripheral device link controller. In some embodiments, the operations of the method 300 may be performed by one or more components of the environments 200, 220 as shown in FIG. 2. The method 300 begins in block 302, in which an I/O controller 152 of the external dock 104 receives device data from an I/O device 154. The I/O data may be any human interface device data, network data, sensor data, or other device data generated by the I/O device 154. The I/O data may be received by the I/O controller 152 over a peripheral communications bus such as USB, Bluetooth, or other communication interface.

In block 304, the I/O controller 152 generates a channel identifier (CID) associated with the I/O device 154 and transmits I/O data, including the CID, to the TBT controller 150 of the external dock 104. For example, the I/O controller 152 may generate one or more direct memory access (DMA) transactions to write the I/O data to memory. The CID may be embodied as an integer value, such as a 16-bit integer. The I/O controller 152 may use any appropriate technique to include the CID in the I/O data, for example embedding the CID in one or more headers or other metadata associated with the I/O data. In some embodiments, in block 306 the I/O controller 152 may generate a PCIe transaction layer packet (TLP) prefix that includes the CID.

Figure 4:
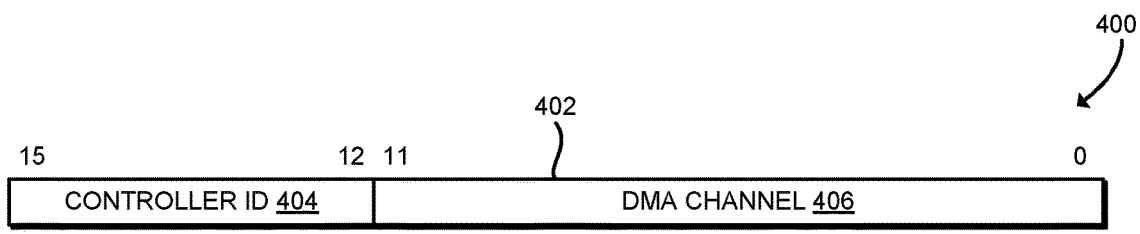
FIG. 4 is a schematic diagram illustrating a channel identifier that may be used by the computing device of FIGS. 1-2.

Referring now to FIG. 4, diagram 400 illustrates one potential embodiment of a CID 402. As shown, the illustrative CID 402 is a 16-bit integer value. Of course, in other embodiments the CID may have a different bit width or other representation. The particular value generated by the I/O controller 152 for the I/O device 154 may be predetermined, for example by being set in the I/O controller 152 at design time (e.g., in a register-transfer level (RTL) representation of the I/O controller 152). As shown, in some embodiments one or more most-significant bits of the CID 402 may be a controller ID 404, and the remaining least-significant bits may be a direct memory access (DMA) channel ID 406. Illustratively, the controller ID 404 is a four-bit value, and the DMA channel ID 406 is a 12-bit value.

In some embodiments, each I/O controller 152 of the external dock 104 may be pre-assigned a block of integers to be used for CIDs. Each CID within the reserved block may be associated with a particular device slot of the I/O controller 152 or otherwise associated with I/O devices 154 connected to the I/O controller 152. For example, an external USB controller 152 that supports up to 64 attached USB devices 154 may be assigned a contiguous block of 64 CIDs. For computing devices 102 that may be used with multiple different designs of external docks 104, each I/O controller 152 of each type of external dock 104 may be assigned to a unique range of CIDs. In those embodiments, the controller ID 404 may be assigned at design time to the I/O controller 152 of the external dock 104. The DMA channel 406 and/or range of DMA channels 406 may be assigned by the I/O controller 152 to I/O devices 154.

Alternatively, in some embodiments the controller ID 404 may be assigned at design time to the TBT controller 146 of the computing device 102. The remaining bits of the CID 402 (i.e., the DMA channel ID 406) may represent a DMA channel number associated with the I/O controller 152 of the external dock 104. In those embodiments, the TBT controller 150 may assign the DMA channel number to each I/O controller 152. Accordingly, by assigning the controller ID 404 to the TBT controller 146, the system 100 may support unique CIDs for each I/O controller 152 connected to the external dock 104.

Referring back to FIG. 3, in block 308, the dock TBT controller 150 encapsulates the I/O data received from the I/O controller 152 into external controller protocol data. For example, the dock TBT controller 150 may add one or more headers or other data to the I/O data to generate an external controller protocol data packet. In some embodiments, in block 310, the dock TBT controller 150 encapsulates PCIe data received from the I/O controller 152 into Thunderbolt protocol data, for example by adding one or more Thunderbolt headers to the I/O data. In some embodiments, in block 312, the dock TBT controller 150 encapsulates the PCIe TLP prefix including the CID into the Thunderbolt protocol data. Additionally or alternatively, although illustrated as generating Thunderbolt protocol data, in some embodiments the I/O data may be encapsulated using any appropriate external peripheral link protocol, tunneling protocol, or other data transfer protocol. In block 314, the dock TBT controller 150 sends the encapsulated data to the host TBT controller 146. In some embodiments, in block 316 the dock TBT controller 150 may send Thunderbolt protocol data over the TBT link 106.

In block 318, the host TBT controller 146 de-encapsulates the I/O data, including the CID. For example, the host TBT controller 146 may remove one or more headers or other data from the external controller protocol data or otherwise extract the I/O data from the external controller protocol data packet. In some embodiments, in block 320 the host TBT controller 146 de-encapsulates Thunderbolt protocol data received over the TBT link 106. For example, the host TBT controller 146 may remove one or more Thunderbolt headers to recover PCIe data. In some embodiments, in block 322 the host TBT controller 146 may de-encapsulate the PCIe TLP prefix that includes the CID.

In block 324, the host TBT controller 146 sends the recovered I/O data to the memory 136. For example, in some embodiments, in block 326 the host TBT controller 146 may send the recovered I/O data via the I/O subsystem 128 over a PCIe bus or other expansion bus. Additionally or alternatively, in some embodiments the host TBT controller 146 may send the recovered I/O data using an internal communication bus such as the secure fabric 130, data port 134, an internal SoC bus, and/or other upstream interface of the host TBT controller 146.

In block 328, the CID filter 132 verifies that the DMA destination address associated with the I/O data is included in a predetermined range of a trusted I/O processor reserved memory (TIO PRM) region that is associated with the CID. The TIO PRM may be embodied as a range of the memory 136 that is inaccessible to any software executed by the processor 120. Each CID may be associated with a sub-range of the TIO PRM, called a CID TIO PRM. By ensuring that the I/O data is written within the TIO PRM, the CID filter 132 may ensure that software cannot access plaintext I/O data. By ensuring that the I/O data is written to the correct CID TIO PRM, the CID filter 132 may allow uniquely identifying the source of the DMA transaction and provide liveness protections.

In block 330, the cryptographic engine 124 copies and encrypts the I/O data from the CID TIO PRM into a memory buffer. For example, microcode of the processor 120 may encrypt the I/O data and store the encrypted data into an ordinary kernel buffer. Thus, only the encrypted I/O data is accessible to untrusted software, which may protect the I/O data from unauthorized disclosure and provide integrity protection. Trusted software, such as a secure enclave established using the secure enclave support 122 of the processor 120, may securely decrypt and process the encrypted I/O data. After copying and encrypting the I/O data, the method 300 loops back to block 300 to continue processing I/O data from the I/O device 154.

It should be appreciated that, in some embodiments, the method 300 may be embodied as various instructions stored on a computer-readable media, which may be executed by the processor 120, the I/O subsystem 128, the I/O controller 142, and/or other components of the computing device 102 to cause the computing device 102 to perform the method 300. The computer-readable media may be embodied as any type of media capable of being read by the computing device 102 including, but not limited to, the memory 136, the data storage device 138, firmware devices, other memory or data storage devices of the computing device 102, portable media readable by a peripheral device 144 of the computing device 102, and/or other media.

Figure 5:
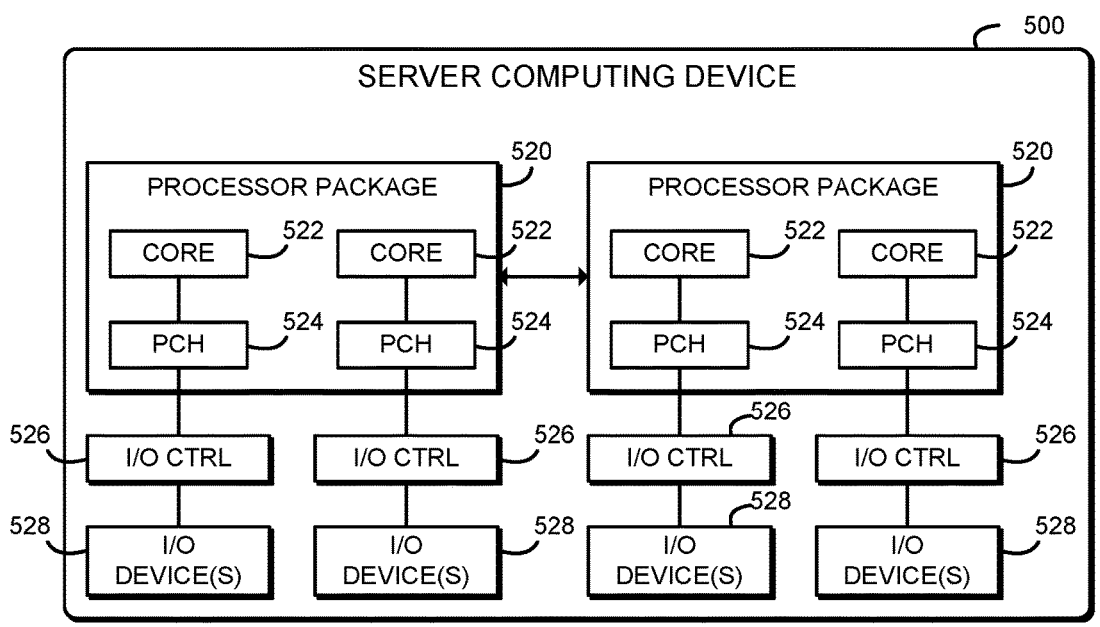
FIG. 5 is a simplified block diagram of at least one embodiment of a server computing device for trusted I/O with multiple processor packages.

Referring now to FIG. 5, an illustrative server computing device 500 for trusted I/O is shown. The computing device 102 may be embodied as any type of device capable of performing the functions described herein. For example, the computing device 102 may be embodied as, without limitation, a server, a multiprocessor system, a rack-mounted server, a blade server, a workstation, and/or a consumer electronic device. As shown in FIG. 5, the server computing device 500 includes multiple processor packages 520. Each processor package 520 includes multiple processor cores 522, and may also include one or more platform controller hubs (PCHs) 524. Each PCH 524 may be embodied as an I/O subsystem or similar circuitry and/or components to facilitate input/output operations with the processor package 520 and/or other components of the server computing device 500. As shown, each PCH 524 may be coupled to one or more I/O controllers 526, which in turn may be coupled with one or more I/O devices 528. The processor packages 520 are connected together by an interconnect, such as an Intel® Ultra Path Interconnect (UPI). The server computing device 500 may also include memory, data storage devices, a communication subsystem, and other or additional components, such as those commonly found in a server computer.

In use, each I/O controller 526 may generate I/O data that includes a channel identifier (CID) that uniquely identifies the I/O device 528 associated with the I/O data. For example, the CID may identifier the particular I/O device 528, I/O controller 526, PCH 524, and processor package 520 associated with the I/O data. The I/O data, including the CID, may be submitted by the I/O controller 526 to the associated PCH 524 to be written to memory. The CID may be used with a CID filter and/or cryptographic engine to provide data security and integrity, as described above. The hierarchical CID used by the server computing device 500 may thus be scalable to multiple different arrangements of processor packages 520, PCHs 524, and I/O controllers 526.

Figure 6:
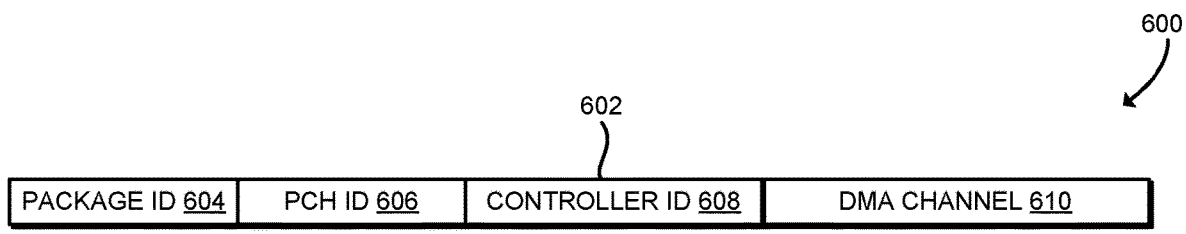
FIG. 6 is a schematic diagram illustrating a channel identifier that may be used by the computing device of FIG. 5.

Referring now to FIG. 6, diagram 600 illustrates one potential embodiment of a CID 602 that may be used by a server computing device 500. As shown, the illustrative CID 602 is an integer value. As shown, one or more most-significant bits of the CID 602 may be a package ID 604 associated with the processor package 520. One or more next-significant bits may be a PCH ID 606 associated with the PCH 524. One or more next-significant bits may be a controller ID 608 associated with the I/O controller 526. The remaining least-significant bits may be a direct memory access (DMA) channel ID 610, which may be associated with the I/O device 528 by the I/O controller 526. In some embodiments, the DMA channel ID 610 may be assigned by an external peripheral device link controller or other controller using techniques similar to those described above in connection with FIGS. 1-4.

EXAMPLES

Illustrative examples of the technologies disclosed herein are provided below. An embodiment of the technologies may include any one or more, and any combination of, the examples described below.

Example 1 includes a system for secure I/O, the system comprising: a computing device that comprises a host controller; and an external dock device coupled to the computing device by an external peripheral link; wherein the external dock device comprises a dock controller and an I/O controller; wherein: the I/O controller is to: (i) receive device data from an I/O device coupled to the external dock device, (ii) generate a first channel identifier associated with the I/O device in response to receipt of the device data, and (iii) transmit I/O data that includes the first channel identifier and the device data to the dock controller; and the dock controller is to (i) encapsulate the I/O data to generate peripheral link protocol data, wherein the peripheral link protocol data includes the first channel identifier, and (ii) transmit the peripheral link protocol data to the host controller of the computing device over the external peripheral link; and wherein the host controller of the computing device is to de-encapsulate the peripheral link protocol data to recover the I/O data, wherein the I/O data includes the first channel identifier.

Example 2 includes the subject matter of Example 1, and wherein the host controller is further to forward the I/O data to a memory of the computing device in response to de-encapsulation of the peripheral link protocol data.

Example 3 includes the subject matter of any of Examples 1 and 2, and wherein the computing device further comprises a cryptographic filter to verify the first channel identifier in response to forwarding of the I/O data to the memory.

Example 4 includes the subject matter of any of Examples 1-3, and wherein the computing device further comprises a processor that includes a cryptographic engine to: encrypt the I/O data to generate encrypted I/O data in response to verification of the first channel identifier, wherein the I/O data is located in a protected memory region of the computing device; and copy the encrypted data to an unprotected memory buffer.

Example 5 includes the subject matter of any of Examples 1-4, and wherein to transmit the I/O data that includes the first channel identifier comprises to transmit a PCI express packet that includes a TLP prefix that is indicative of the first channel identifier.

Example 6 includes the subject matter of any of Examples 1-5, and wherein the external peripheral link comprises a multi-mode bidirectional digital data link.

Example 7 includes the subject matter of any of Examples 1-6, and wherein the external peripheral link comprises a copper cable or an optical link.

Example 8 includes the subject matter of any of Examples 1-7, and wherein the external peripheral link comprises a Thunderbolt link.

Example 9 includes the subject matter of any of Examples 1-8, and wherein to encapsulate the I/O data comprises to add a Thunderbolt header to a PCI Express packet.

Example 10 includes the subject matter of any of Examples 1-9, and wherein the first channel identifier comprises a predetermined integer value associated with the I/O controller of the external dock device.

Example 11 includes the subject matter of any of Examples 1-10, and wherein the first channel identifier is included in a predetermined range of integer values that is associated with the I/O controller of the external dock device.

Example 12 includes the subject matter of any of Examples 1-11, and wherein the first channel identifier comprises an integer value, and wherein the first channel identifier includes a controller identifier, wherein the controller identifier comprises a predetermined integer value associated with the host controller.

Example 13 includes the subject matter of any of Examples 1-12, and wherein the dock controller is further to assign a DMA channel number to the I/O device coupled to the external dock device, wherein the first channel identifier further comprises the DMA channel number.

Example 14 includes the subject matter of any of Examples 1-13, and wherein the first channel identifier comprises a 16-bit value, wherein the controller identifier comprises the four most-significant bits of the first channel identifier, and wherein the DMA channel number comprises the eight least-significant bits of the first channel identifier.

Example 15 includes a computing device for secure I/O, the computing device comprising: a first package that includes a first I/O subsystem; and an I/O controller to (i) generate a first channel identifier associated with an I/O device coupled to the I/O controller and (ii) transmit I/O data that includes the first channel identifier and the device data to the first I/O subsystem; wherein the first channel identifier comprises an integer value, and wherein the first channel identifier includes a package identifier associated with the first package, an I/O subsystem identifier associated with the first I/O subsystem, and a controller identifier associated with the I/O controller.

Example 16 includes the subject matter of Example 15, and wherein the first I/O subsystem comprises a platform controller hub.

Example 17 includes the subject matter of any of Examples 15 and 16, and wherein the package identifier comprises a first predetermined integer value associated with the first package.

Example 18 includes the subject matter of any of Examples 15-17, and wherein the I/O subsystem identifier comprises a second predetermined integer value associated with the first I/O subsystem.

Example 19 includes the subject matter of any of Examples 15-18, and wherein the controller identifier comprises a third predetermined integer value associated with the I/O controller.

Example 20 includes the subject matter of any of Examples 15-19, and wherein the I/O controller is to assign a DMA channel number to the I/O device, wherein the first channel identifier further comprises the DMA channel number.

Example 21 includes the subject matter of any of Examples 15-20, and further comprising a plurality of packages, wherein each package comprises a plurality of I/O subsystems.

Example 22 includes the subject matter of any of Examples 15-21, and wherein to transmit the I/O data that includes the first channel identifier comprises to transmit a PCI express packet that includes a TLP prefix that is indicative of the first channel identifier.

Example 23 includes a method for secure I/O, the method comprising: receiving, by an I/O controller of an external dock device, device data from an I/O device coupled to the external dock device; generating, by the I/O controller, a first channel identifier associated with the I/O device in response to receiving the device data; transmitting, by the I/O controller, I/O data that includes the first channel identifier and the device data to a dock controller of the external dock device; encapsulating, by the dock controller of the external dock device, the I/O data to generate peripheral link protocol data, wherein the peripheral link protocol data includes the first channel identifier; transmitting, by the dock controller, the peripheral link protocol data to a host controller of a computing device over an external peripheral link, wherein the computing device and the external dock device are coupled by the external peripheral link; and de-encapsulating, by the host controller, the peripheral link protocol data to recover the I/O data, wherein the I/O data includes the first channel identifier.

Example 24 includes the subject matter of Example 23, and further comprising forwarding, by the host controller, the I/O data to a memory of the computing device in response to de-encapsulating the peripheral link protocol data.

Example 25 includes the subject matter of any of Examples 23 and 24, and further comprising verifying, by a cryptographic filter of the computing device, the first channel identifier in response to forwarding the I/O data to memory.

Example 26 includes the subject matter of any of Examples 23-25, and further comprising: encrypting, by a cryptographic engine of a processor of the computing device, the I/O data to generate encrypted I/O data in response to verifying the first channel identifier, wherein the I/O data is located in a protected memory region of the computing device; and copying, by the cryptographic engine, the encrypted data to an unprotected memory buffer.

Example 27 includes the subject matter of any of Examples 23-26, and wherein transmitting the I/O data that includes the first channel identifier comprises transmitting a PCI express packet that includes a TLP prefix that is indicative of the first channel identifier.

Example 28 includes the subject matter of any of Examples 23-27, and wherein the external peripheral link comprises a multi-mode bidirectional digital data link.

Example 29 includes the subject matter of any of Examples 23-28, and wherein the external peripheral link comprises a copper cable or an optical link.

Example 30 includes the subject matter of any of Examples 23-29, and wherein the external peripheral link comprises a Thunderbolt link.

Example 31 includes the subject matter of any of Examples 23-30, and wherein encapsulating the I/O data comprises adding a Thunderbolt header to a PCI Express packet.

Example 32 includes the subject matter of any of Examples 23-31, and wherein the first channel identifier comprises a predetermined integer value associated with the I/O controller of the external dock device.

Example 33 includes the subject matter of any of Examples 23-32, and wherein the first channel identifier is included in a predetermined range of integer values that is associated with the I/O controller of the external dock device.

Example 34 includes the subject matter of any of Examples 23-33, and wherein the first channel identifier comprises an integer value, and wherein the first channel identifier includes a controller identifier, wherein the controller identifier comprises a predetermined integer value associated with the host controller.

Example 35 includes the subject matter of any of Examples 23-34, and further comprising assigning, by the dock controller, a DMA channel number to the I/O device coupled to the external dock device, wherein the first channel identifier further comprises the DMA channel number.

Example 36 includes the subject matter of any of Examples 23-35, and wherein the first channel identifier comprises a 16-bit value, wherein the controller identifier comprises the four most-significant bits of the first channel identifier, and wherein the DMA channel number comprises the eight least-significant bits of the first channel identifier.

Example 37 includes a method for secure I/O, the method comprising: generating, by an I/O controller of a computing device, a first channel identifier associated with an I/O device coupled to the I/O controller; and transmitting, by the I/O controller, I/O data that includes the first channel identifier and the device data to a first I/O subsystem of the computing device, wherein the I/O subsystem is included in a first package of the computing device; wherein the first channel identifier comprises an integer value, and wherein the first channel identifier includes a package identifier associated with the first package, an I/O subsystem identifier associated with the first I/O subsystem, and a controller identifier associated with the I/O controller.

Example 38 includes the subject matter of Example 37, and wherein the first I/O subsystem comprises a platform controller hub.

Example 39 includes the subject matter of any of Examples 37 and 38, and wherein the package identifier comprises a first predetermined integer value associated with the first package.

Example 40 includes the subject matter of any of Examples 37-39, and wherein the I/O subsystem identifier comprises a second predetermined integer value associated with the first I/O subsystem.

Example 41 includes the subject matter of any of Examples 37-40, and wherein the controller identifier comprises a third predetermined integer value associated with the I/O controller.

Example 42 includes the subject matter of any of Examples 37-41, and further comprising assigning, by the I/O controller, a DMA channel number to the I/O device, wherein the first channel identifier further comprises the DMA channel number.

Example 43 includes the subject matter of any of Examples 37-42, and wherein the computing device comprises a plurality of packages and wherein each package comprises a plurality of I/O subsystems.

Example 44 includes the subject matter of any of Examples 37-43, and wherein transmitting the I/O data that includes the first channel identifier comprises transmitting a PCI express packet that includes a TLP prefix that is indicative of the first channel identifier.

Example 45 includes a computing device comprising: a processor; and a memory having stored therein a plurality of instructions that when executed by the processor cause the computing device to perform the method of any of Examples 23-44.

Example 46 includes one or more non-transitory, computer readable storage media comprising a plurality of instructions stored thereon that in response to being executed result in a computing device performing the method of any of Examples 23-44.

Example 47 includes a computing device comprising means for performing the method of any of Examples 23-44.

Example 48 includes a system for secure I/O, the system comprising: means for receiving, by an I/O controller of an external dock device, device data from an I/O device coupled to the external dock device; means for generating, by the I/O controller, a first channel identifier associated with the I/O device in response to receiving the device data; means for transmitting, by the I/O controller, I/O data that includes the first channel identifier and the device data to a dock controller of the external dock device; means for encapsulating, by the dock controller of the external dock device, the I/O data to generate peripheral link protocol data, wherein the peripheral link protocol data includes the first channel identifier; means for transmitting, by the dock controller, the peripheral link protocol data to a host controller of a computing device over an external peripheral link, wherein the computing device and the external dock device are coupled by the external peripheral link; and means for de-encapsulating, by the host controller, the peripheral link protocol data to recover the I/O data, wherein the I/O data includes the first channel identifier.

Example 49 includes the subject matter of Example 48, and further comprising means for forwarding, by the host controller, the I/O data to a memory of the computing device in response to de-encapsulating the peripheral link protocol data.

Example 50 includes the subject matter of any of Examples 48 and 49, and further comprising means for verifying, by a cryptographic filter of the computing device, the first channel identifier in response to forwarding the I/O data to memory.

Example 51 includes the subject matter of any of Examples 48-50, and further comprising: means for encrypting, by a cryptographic engine of a processor of the computing device, the I/O data to generate encrypted I/O data in response to verifying the first channel identifier, wherein the I/O data is located in a protected memory region of the computing device; and means for copying, by the cryptographic engine, the encrypted data to an unprotected memory buffer.

Example 52 includes the subject matter of any of Examples 48-51, and wherein the means for transmitting the I/O data that includes the first channel identifier comprises means for transmitting a PCI express packet that includes a TLP prefix that is indicative of the first channel identifier.

Example 53 includes the subject matter of any of Examples 48-52, and wherein the external peripheral link comprises a multi-mode bidirectional digital data link.

Example 54 includes the subject matter of any of Examples 48-53, and wherein the external peripheral link comprises a copper cable or an optical link.

Example 55 includes the subject matter of any of Examples 48-54, and wherein the external peripheral link comprises a Thunderbolt link.

Example 56 includes the subject matter of any of Examples 48-55, and wherein the means for encapsulating the I/O data comprises means for adding a Thunderbolt header to a PCI Express packet.

Example 57 includes the subject matter of any of Examples 48-56, and wherein the first channel identifier comprises a predetermined integer value associated with the I/O controller of the external dock device.

Example 58 includes the subject matter of any of Examples 48-57, and wherein the first channel identifier is included in a predetermined range of integer values that is associated with the I/O controller of the external dock device.

Example 59 includes the subject matter of any of Examples 48-58, and wherein the first channel identifier comprises an integer value, and wherein the first channel identifier includes a controller identifier, wherein the controller identifier comprises a predetermined integer value associated with the host controller.

Example 60 includes the subject matter of any of Examples 48-59, and further comprising means for assigning, by the dock controller, a DMA channel number to the I/O device coupled to the external dock device, wherein the first channel identifier further comprises the DMA channel number.

Example 61 includes the subject matter of any of Examples 48-60, and wherein the first channel identifier comprises a 16-bit value, wherein the controller identifier comprises the four most-significant bits of the first channel identifier, and wherein the DMA channel number comprises the eight least-significant bits of the first channel identifier.

Example 62 includes a computing device for secure I/O, the computing device comprising: means for generating, by an I/O controller of the computing device, a first channel identifier associated with an I/O device coupled to the I/O controller; and means for transmitting, by the I/O controller, I/O data that includes the first channel identifier and the device data to a first I/O subsystem of the computing device, wherein the I/O subsystem is included in a first package of the computing device; wherein the first channel identifier comprises an integer value, and wherein the first channel identifier includes a package identifier associated with the first package, an I/O subsystem identifier associated with the first I/O subsystem, and a controller identifier associated with the I/O controller.

Example 63 includes the subject matter of Example 62, and wherein the first I/O subsystem comprises a platform controller hub.

Example 64 includes the subject matter of any of Examples 62 and 63, and wherein the package identifier comprises a first predetermined integer value associated with the first package.

Example 65 includes the subject matter of any of Examples 62-64, and wherein the I/O subsystem identifier comprises a second predetermined integer value associated with the first I/O subsystem.

Example 66 includes the subject matter of any of Examples 62-65, and wherein the controller identifier comprises a third predetermined integer value associated with the I/O controller.

Example 67 includes the subject matter of any of Examples 62-66, and further comprising means for assigning, by the I/O controller, a DMA channel number to the I/O device, wherein the first channel identifier further comprises the DMA channel number.

Example 68 includes the subject matter of any of Examples 62-67, and wherein the computing device comprises a plurality of packages and wherein each package comprises a plurality of I/O subsystems.

Example 69 includes the subject matter of any of Examples 62-68, and wherein the means for transmitting the I/O data that includes the first channel identifier comprises means for transmitting a PCI express packet that includes a TLP prefix that is indicative of the first channel identifier.

The invention claimed is:
1. A system for secure I/O, the system comprising:
a computing device that comprises a host controller; and
an external dock device coupled to the computing device by an external peripheral link;
wherein the external dock device comprises a dock controller and an I/O controller; wherein:
the I/O controller is to: (i) receive device data from an I/O device coupled to the external dock device, (ii) generate a first channel identifier associated with the I/O device in response to receipt of the device data, and (iii) transmit I/O data that includes the first channel identifier and the device data to the dock controller; and
the dock controller is to (i) encapsulate the I/O data to generate peripheral link protocol data, wherein the peripheral link protocol data includes encapsulated data that includes the first channel identifier, and (ii) transmit the peripheral link protocol data to the host controller of the computing device over the external peripheral link; and wherein the host controller of the computing device is to de-encapsulate the peripheral link protocol data to recover the I/O data, wherein the I/O data includes the first channel identifier.

2. The system of claim 1, wherein the host controller is further to forward the I/O data to a memory of the computing device in response to de-encapsulation of the peripheral link protocol data.

3. The system of claim 2, wherein the computing device further comprises a cryptographic filter to verify the first channel identifier in response to forwarding of the I/O data to the memory.

4. The system of claim 3, wherein the computing device further comprises a processor that includes a cryptographic engine to:
encrypt the I/O data to generate encrypted I/O data in response to verification of the first channel identifier, wherein the I/O data is located in a protected memory region of the computing device; and
copy the encrypted data to an unprotected memory buffer.

5. The system of claim 1, wherein the external peripheral link comprises a multi-mode bidirectional digital data link.

6. The system of claim 5, wherein the external peripheral link comprises a copper cable or an optical link.

7. The system of claim 5, wherein the external peripheral link comprises a Thunderbolt link.

8. The system of claim 7, wherein to encapsulate the I/O data comprises to add a Thunderbolt header to a PCI Express packet.

9. The system of claim 1, wherein the first channel identifier comprises a predetermined integer value associated with the I/O controller of the external dock device.

10. The system of claim 9, wherein the first channel identifier is included in a predetermined range of integer values that is associated with the I/O controller of the external dock device.

11. The system of claim 1, wherein the first channel identifier comprises an integer value, and wherein the first channel identifier includes a controller identifier, wherein the controller identifier comprises a predetermined integer value associated with the host controller.

12. The system of claim 11, wherein the dock controller is further to assign a DMA channel number to the I/O device coupled to the external dock device, wherein the first channel identifier further comprises the DMA channel number.

13. The system of claim 12, wherein the first channel identifier comprises a 16-bit value, wherein the controller identifier comprises the four most-significant bits of the first channel identifier, and wherein the DMA channel number comprises the eight least-significant bits of the first channel identifier.

14. A method for secure I/O, the method comprising:
receiving, by an I/O controller of an external dock device, device data from an I/O device coupled to the external dock device;
generating, by the I/O controller, a first channel identifier associated with the I/O device in response to receiving the device data;
transmitting, by the I/O controller, I/O data that includes the first channel identifier and the device data to a dock controller of the external dock device;
encapsulating, by the dock controller of the external dock device, the I/O data to generate peripheral link protocol data, wherein the peripheral link protocol data includes encapsulated data that includes the first channel identifier;
transmitting, by the dock controller, the peripheral link protocol data to a host controller of a computing device over an external peripheral link, wherein the computing device and the external dock device are coupled by the external peripheral link; and
de-encapsulating, by the host controller, the peripheral link protocol data to recover the I/O data, wherein the I/O data includes the first channel identifier.

15. The method of claim 14, further comprising forwarding, by the host controller, the I/O data to a memory of the computing device in response to de-encapsulating the peripheral link protocol data.

16. The method of claim 14, wherein the external peripheral link comprises a multi-mode bidirectional digital data link.

17. The method of claim 14, wherein the first channel identifier comprises a predetermined integer value associated with the I/O controller of the external dock device.

18. The method of claim 17, wherein the first channel identifier is included in a predetermined range of integer values that is associated with the I/O controller of the external dock device.

19. The method of claim 14, wherein the first channel identifier comprises an integer value, and wherein the first channel identifier includes a controller identifier, wherein the controller identifier comprises a predetermined integer value associated with the host controller.

20. One or more non-transitory, computer-readable storage media comprising a plurality of instructions stored thereon that, in response to being executed, cause a system to:
receive, by an I/O controller of an external dock device, device data from an I/O device coupled to the external dock device;
generate, by the I/O controller, a first channel identifier associated with the I/O device in response to receiving the device data;
transmit, by the I/O controller, I/O data that includes the first channel identifier and the device data to a dock controller of the external dock device;
encapsulate, by the dock controller of the external dock device, the I/O data to generate peripheral link protocol data, wherein the peripheral link protocol data includes encapsulated data that includes the first channel identifier;
transmit, by the dock controller, the peripheral link protocol data to a host controller of a computing device over an external peripheral link, wherein the computing device and the external dock device are coupled by the external peripheral link; and
de-encapsulate, by the host controller, the peripheral link protocol data to recover the I/O data, wherein the I/O data includes the first channel identifier.

21. The one or more non-transitory, computer-readable storage media of claim 20, further comprising plurality of instructions stored thereon that, in response to being executed, cause the system to forward, by the host controller, the I/O data to a memory of the computing device in response to de-encapsulating the peripheral link protocol data.

22. The one or more non-transitory, computer-readable storage media of claim 20, wherein the external peripheral link comprises a multi-mode bidirectional digital data link.

23. The one or more non-transitory, computer-readable storage media of claim 20, wherein the first channel identifier comprises a predetermined integer value associated with the I/O controller of the external dock device.

24. The one or more non-transitory, computer-readable storage media of claim 23, wherein the first channel identifier is included in a predetermined range of integer values that is associated with the I/O controller of the external dock device.

25. The one or more non-transitory, computer-readable storage media of claim 20, wherein the first channel identifier comprises an integer value, and wherein the first channel identifier includes a controller identifier, wherein the controller identifier comprises a predetermined integer value associated with the host controller.

* * * * *